July 30, 1935.  J. MILLER  2,009,897
HOSE CLAMP
Filed March 9, 1934
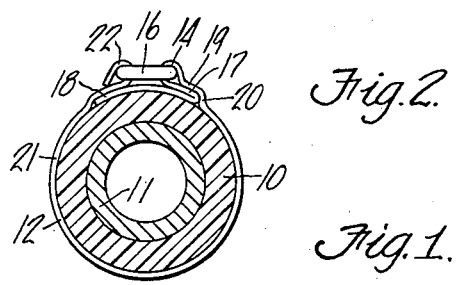
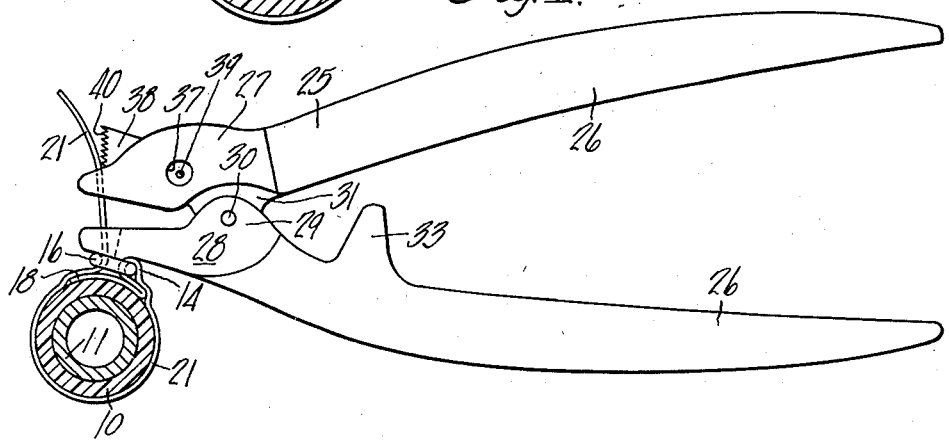
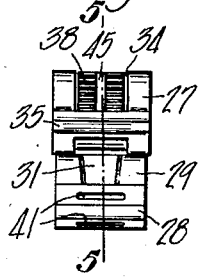
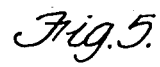
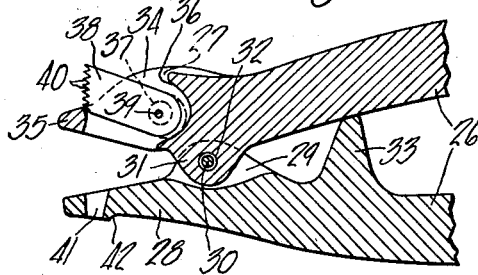
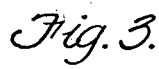
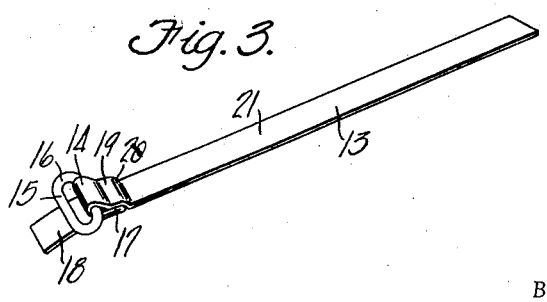
INVENTOR.
Joseph Miller.
BY
ATTORNEY.

Patented July 30, 1935

2,009,897

UNITED STATES PATENT OFFICE 2,009,897

HOSE CLAMP

Joseph Miller, South Bend, Ind.

Application March 9, 1934, Serial No. 714,806

6 Claims. (Cl. 24—20)

The invention relates to hose clamps, and has for its primary object to provide a clamp which will effectively maintain a connection with a high pressure hose.

A further object is to provide a novel clamp which may be readily applied to hose of any of a wide variety of sizes.

A further object is to provide a novel clamp which may be applied to a hose to constrictively engage said hose with any desired pressure within a wide range of pressures.

A further object is to provide a novel hose clamp constructed to engage the hose at substantially all points on its circumference.

A further object is to provide a hose clamp comprising a metal strap carrying a retaining member at one end by which the other end is secured, a portion of said strap underlying said retaining member.

A further object is to provide a strap clamp having locking means, said strap being arranged relative to said locking means to provide a substantially continuous circumferential pressure engagement with said hose.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a view illustrating the clamp in end elevation and the applying tool in side elevation, said tool being operatively associated with the clamp.

Figure 2 is an end view of the clamp in operative relation to the hose.

Figure 3 is a perspective view of the clamp in inoperative shape.

Figure 4 is an end view of the head of the tool.

Figure 5 is a fragmentary longitudinal sectional view of the tool taken on line 5—5 of Figure 4.

Referring to the drawing, which illustrates the preferred embodiment of the invention, the numeral 10 designates a hose carrying a coupling member 11 and encircled by a clamp 12 adapted to grip said hose to establish an operative connection between said hose and coupling. Clamp 12 comprises a metal strap 13 provided with a loop 14 adjacent one end. Loop 14 encircles one of two spaced parallel portions 15 of an endless retaining member 16. One end of strap 13 extends from loop 14 to form a short curved portion 17, and terminates in a curved return bent portion 18 which underlies said retaining member 16, said retaining member preferably lying parallel to a plane which is tangent to portion 18 at the center of said portion. The other end of strap 13 extends from a loop 14 to provide a portion 19 overlying portion 17 and defined by a bend 20 overlying the bend between portions 17 and 18 of the strap, and terminates in an elongated portion 21.

In the application of the clamp to a hose, the curved portion 18 of the strap is placed in face contacting engagement with the hose, and elongated portion 21 of the strap is bent around the hose and passed through retaining member 16. The end of portion 21 projecting from said retaining member is then drawn or pulled upon to draw the clamp tight on the hose, and a loop 22 is formed therein by reversely bending strap portion 21 in return bent direction about the portion 15 of retaining member 16 opposite that encircled by loop 14. It will thus be seen that, by tightening the strap, the retaining member is drawn radially inwardly on the hose and presses upon strap portion 18 at its center. At the opposite ends of strap portion 18 similar pressure is exerted by the overlapping portions 19 and 21 of the strap. The major extent of portion 21 of the strap engages the hose, and, when the clamp has been tightly drawn, is disposed substantially concentrically of strap portion 18. In this way a substantially continuous circumferential bearing engagement of the strap on the hose is provided, the only points at which such engagement is not provided being at the ends of portion 18 where a very small portion of the hose is untouched as a result of the bend made in the strap to overlie portion 18. When the clamp is tightly drawn to place on the hose, the effect thereof is a continuous circumferential constriction unaffected by the small spacing of the hose contacting portions at the end of said portion 18. Loops 14 and 22 effectively maintain the constrictive position of the strap and their engagement with retaining member 16 without requiring additional securing means.

The tool 25 which forms means for applying and tightening the clamp above described comprises a pair of members normally spaced throughout their length and pivotally interconnected adjacent one end thereof. These members each comprise a handle portion 26 and these handle portions carry heads 27 and 28. Lower head 28 has integrally formed therewith a pair of spaced upwardly directed ears 29 mounting the ends of a pin 30; and upper head 27 has integrally formed therewith a centrally disposed downwardly directed ear 31 which fits loosely between ears 29 and which has an aperture 32 extending transversely therethrough for the reception of pin 30, said aperture being substantially larger than said pin, whereby the pivotal interconnection of said heads is loose, for purposes to be hereinafter set forth. One of the handles 26 is preferably provided with an inwardly directed arm 33 to limit the pivoting of said members in one direction, opposite pivoting of said members being limited by face contacting interengagement of the inner faces of the jaws 27 and 28.

Upper head or jaw 28 of the tool has a large vertical opening 34 formed therein in forwardly disposed relation to pivot pin 30, said opening 34 extending adjacent the forward end of said head to provide a transversely extending bar 35 at the tip of said head 28. The rear face 36 of opening 34 is of concave configuration, for purposes to be hereinafter set forth. Communicating with the opening 34 are aligned apertures 37 which extend transversely through head 28 adjacent the rear of said opening 34.

A rectangular bar 38, formed of hardened tool steel or like material, is loosely positioned in opening 34 for free movement therein, the rear end of said bar being of arcuate shape, as illustrated in Figure 5. Substantially concentrically of the rear end of bar 38 is disposed a transversely extending pin 39 whose ends project laterally of said bar and into the apertures 36 of tool head 27, said pin being considerably smaller than said apertures whereby said bar 38 may have free longitudinal and pivotal movement in said head, said pin serving merely to prevent removal of said bar from the opening 34 in head 27. The front end of bar 38 is provided with a plurality of transversely extending teeth 40, the general outline of the front end of said bar being that of an arc whose center is disposed above the center line of said bar.

A vertical, transversely elongated opening 41 is formed in the lower head or jaw 28 in closely spaced relation to the forward end of said head, the forward end of said opening substantially coinciding with the forward end of opening 34 in head 27. In rearwardly spaced relation to opening 41, the bottom face of head 28 is provided with an inwardly directed curve 42 to provide a shoulder in said face, for purposes to be hereinafter set forth.

The use of the tool is as follows: After the portion 21 of strap 13 has been bent around hose 10 and passed through retaining member 16, the end of said strap projecting from retaining member 16 is passed through the opening 41 of head 28 of the tool and also through the forward end of the opening 34 of head 27 of the tool. The forward end of the lower face of the head 28 of the tool is then flatly laid upon the retaining member 16, as illustrated in Figure 5, with the loop 14 of the strap 13 fitting snugly in the curved portion 42 in said lower face of head 28. Bar 38 is then disposed in position to permit the teeth 40 thereof to engage the portion of strap 13 projecting through opening 34 in head 27 of the tool, said bar being positioned with its rear end in engagement with the concave face 36 of said opening 34. Pressure is then applied to the handles 26 of the tool to pull upon strap 13 which is tightly gripped between the toothed end of bar 38 and the transverse bar 35 of head 28. The greater the force applied to spread to heads 27 and 28 and thereby pull on strap 13, the tighter will be the gripping action on said strap, so that all possibility of slippage is absolutely eliminated. When handles 26 have been pivoted in the direction of each other to the full limit permitted by member 33, whereby a new grip is required to be effected on the strap to permit further tightening of the strap, the handle members are oppositely or outwardly pivoted to bring the inner faces of heads 27 and 28 into engagement, which action serves automatically to loosen the grip of bar 38 on the strap whereby said bar may be reset to effect further drawing on the strap when the inwardly pivoting movement is again applied to the handles. The strap 13, when being drawn upon, must bend around the member 15 of retaining member 16, and the bend so formed serves as the means for retaining the degree of tautness to which the strap has previously been drawn, during the interval required for re-setting of the tool preparatory to further tightening; and the bend also serves to maintain the portion of the strap which passes through the tool stationary during the time the heads are pivoted in the direction of each other, whereby relative movement of the head 27 thereto releases bar 38.

By the use of this clamp and tool the constrictive force of the clamp upon the hose may be regulated to comply with the conditions under which the hose is to be used. Thus, hose subjected to low pressures can have the clamp applied thereto just sufficiently tightly to withstand the pressure, while hose subjected to high pressures requires a tight drawing of the clamp, even to the extent that the clamp bites into the hose. Hose subjected to exceedingly high pressures may therefore be effectively clamped by this device, the device having been successfully employed to clamp, in practical service, hose subjected to pressures up to 350 pounds per square inch. It will also be seen that clamps of this character may be employed for many purposes other than to clamp hose, for instance, to provide a reinforcing strap for a crate or other container.

The invention having been set forth, what is claimed as new and useful is:—

1. A clamp comprising an endless retaining member including spaced parallel portions, a strap bent around one of said retaining member portions intermediate its ends, one end portion of said strap comprising a curved portion extending in spaced relation to said retaining member and a return bent portion underlying said retaining member, the other end portion overlying the first mentioned part of the other end portion and encircling an object to be clamped, said last named portion being bent around the opposite retaining member portion, the return bent portion of said first named strap portion serving with said last named strap portion to provide a continuous circumferential engagement with said object.

2. A clamp comprising an endless member, and a metal strap having a loop intermediate its ends passing through said endless member and encircling a portion thereof, one portion of said strap being bendable about an object with its free end passing through said endless member and looped to encircle a portion thereof, the other portion of said strap extending in spaced relation to said first strap portion and being return bent to underlie said endless member, said first named portion and said return bent portion providing a substantially continuous bearing engagement with said object.

3. A clamp comprising a retaining member, and a strap encircling an object to be clamped, said strap having a loop formed at one end thereof and engaging said retaining member and a second loop formed adjacent the other end thereof and engaging said retaining member, the remainder of said strap being folded under said retaining member in face contacting engagement with said object.

4. A clamp comprising a strap encircling an object to be clamped, and a retaining member carried at its opposite ends by opposite ends of said strap, and an extension carried by one end of said strap and underlying said retaining member in engagement with said object, said strap and extension providing continuous circumferential engagement with said object.

5. In a clamp, a metal strap comprising an end portion adapted for face contacting engagement with an object to be clamped, a return bent portion overlying said end portion, a second return bent portion overlying said first return bent portion and having an inward bend overlying said first return bend, a portion extending from said inward bend and encircling said object, an endless member overlying said end portion and disposed substantially centrally thereof, said strap having a loop formed between said return bent portions and passing through said endless member, the end of said object encircling portion overlying said end portion and terminating in a loop extending through and engaging said endless member opposite said first loop, said end portion and encircling portion providing substantially continuous circumferential engagement with said object.

6. A clamp comprising a strap adapted to encircle an object to be clamped and provided with loops at its opposite ends, a retaining member including spaced parts encircled by said loops, and a member carried by said strap and underlying said retaining member and portions of said strap adjacent said loops, said strap being inwardly bent over the opposite ends of said last named member into engagement with said object to provide substantially continuous circumferential engagement with said object by said strap and last named member.

JOSEPH MILLER.